(12) United States Patent
Kim

(10) Patent No.: US 6,768,904 B2
(45) Date of Patent: Jul. 27, 2004

(54) DATA COMMUNICATION METHOD USING MOBILE TERMINAL

(75) Inventor: Shin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 471 days.

(21) Appl. No.: 09/967,989

(22) Filed: Oct. 2, 2001

(65) Prior Publication Data

US 2002/0042264 A1 Apr. 11, 2002

(30) Foreign Application Priority Data

Oct. 11, 2000 (KR) ......................................... 2000-59705

(51) Int. Cl.$^7$ ............................................... H04B 1/38
(52) U.S. Cl. ..................................................... 455/414
(58) Field of Search ............................. 455/556.1, 557, 455/426.1, 414.1

(56) References Cited

U.S. PATENT DOCUMENTS

| | | | |
|---|---|---|---|
| 6,370,399 B1 * | 4/2002 | Phillips | 455/564 |
| 6,519,458 B2 * | 2/2003 | Oh et al. | 455/445 |
| 6,571,109 B1 * | 5/2003 | Kim | 455/555 |
| 6,654,605 B1 * | 11/2003 | Seo | 455/426 |

* cited by examiner

*Primary Examiner*—Creighton Smith
(74) *Attorney, Agent, or Firm*—Fleshner & Kim, LLP

(57) ABSTRACT

A method for transmitting data in a data communication system having a mobile terminal and a transmitting/receiving terminal is enclosed. The method includes the steps of establishing a voice communication channel between the mobile terminal and a receiving data terminal in the data communication system set to a Voice mode, setting the data communication system to a Data mode without disconnecting the voice communication channel by transmitting a first connection request and a telephone number of the receiving data terminal by the transmitting data terminal to the mobile terminal, establishing a data communication channel between the transmitting and receiving data terminals, and transmitting data to the receiving data terminal through the data communication channel. By sending a receiving side telephone number to the mobile terminal together with a connection request signal (ATD command) as shown in the data communication method according to the present invention, a user can transmit or receive data more conveniently during the wireless conversation. The mode of the communication system can simply be converted from a Voice mode to a Data (Fax) mode by transmitting a ATD command together with a receiving side telephone number so that it can provide a substantial convenience to a user when transmitting or receiving data during the wireless phone conversation.

9 Claims, 2 Drawing Sheets

DATA COMMUNICATION METHOD USING MOBILE TERMINAL

BACKGROUND OF THE INVENTION

1. Field of the Invention

The present invention relates to a mobile data communication system including a mobile terminal, and more particularly, to methods for transmitting and receiving data in a data communication system having a mobile station. Using the method according to the present invention, a user can transmit or receive data through a data communication channel by transmitting and receiving a ATD command and a receiving side telephone number without disconnecting the wireless voice communication line connection made earlier.

2. Background of the Related Art

The basic objective of the current research and development of the GSM (Global System for Mobile) digital cellular phones is to provide an outstanding global wireless communication service by building a global GSM network. The service should include not only a voice service, but also a data service, a fax service, a short message service, and many other supplemental services so that a global mobile management service can be provided to enable a user to be connected with others.

For providing a data (fax) service among the services mentioned above, a typical mobile station requires a fax adapter and can support up to a 2.4 kbit/s transmission rate depending on the type of the mobile terminal and the type of the communication service. On the other hand, A PC for a high-speed data service can support up to a 9.6 kbit/s transmission rate.

FIG. 1 illustrates a typical wireless data communication system. The system includes a transmitting/receiving data terminal (i.e., PC) 10 running an application program for a high-speed data service in order to send/receive the data in series; a mobile terminal (MT) 20 performing a data communicating function and modem controlling functions of the communication software and an IWF (Interworking function) by combining a call detecting function and a switching function; a base station (BS) 30 broadcasting the wireless data communication of the mobile terminal 20; a BSC (Base Station Controller) 40 controlling the base station 30; a MSC (Mobile Switching Center) 50 determining a communication line depending upon the communication service requested by the mobile terminal 20; an IWF (Interworking Function) 60 being connected to the MSC 50 and having a modem pooling function for connecting to the internet; a service network (i.e. PSTN: Public Switch Telephone Network) 70 for the data communication; and a receiving/transmitting data terminal 80.

The data terminal 10 includes a personal computer and a PDA (Personal Digital Assistant) that run the application software for the high-speed data service to transmit/receive data in series to/from the mobile terminal 20. Additionally, the BSC 40 uses Signaling System No. 7 to establish a data call in response to a call request for the data service and to manage a signal link when performing handover. The MSC 50 handles a mobile call operation, a subscriber information process, a visiting subscriber management, a data call operation with the IWF 60, and a process for interworking with other networks such as PSTN or PCS. The IWF 60 performs a modem pooling in order to connect to an internet or a data service call.

In order to have a voice conversation using the mobile terminal 20 and to transmit data using the data terminal 10, an ATD command is inputted. The ATD request signal is transmitted to the BSC 40 and MSC 50 through the base station 30 by the mobile terminal 20. The MSC 50 initially identifies the data service option; makes a connection request to the data terminal 80, which is connected to the PSTN 70, of the receiving subscriber according to the ATD request signal; and reports to the mobile terminal 20 after confirming with MSC 50 if the data terminal 80 accepts the request. Thereafter, the IWF accomplishes the modem communication by negotiating with the receiving subscriber. Therefore, once a data communication channel is accomplished, the data is received or transmitted through a modem assigned to the IWF 60 by the application program.

When the application program requests to terminate the data service according to the line restoration request from the transmitting subscriber, the mobile terminal 20 transmits a modem canceling request signal through the IWF 60 in order to cancel the assigned modem, and it restores the link to the MSC 50. When the link through a modem is completed, the line between the MSC 50 and the mobile terminal emulator is restored. Then the line between the transmitting subscriber and the MSC 50 is restored according to the call restoring request made by the transmitting subscriber, and the data service gets terminated.

On the other hand, when the data terminal 10 (i.e., facsimile) sends a receiving call request to the BSC 40, the BSC 40 pages the mobile terminal 20 through a TCP/IP protocol. When the mobile terminal 20 repeatedly transmits the ring signal being indicative of an incoming call in order to convert to a facsimile receiving mode in the application program, the application program of the data terminal 10 that received the call transmits ATA signal, and the mobile terminal 20 sends a reply message after confirming the receipt of the ATA signal. The mobile terminal 20 sends a connection message indicating the fax data receiving condition to the MSC 50, and it sends a ATD command to the IWF 60 after a predetermined time period in order to achieve a fax data communication. When the mobile terminal 20 receives a call canceling request message upon completion of the data transmission, it sends a modem resetting control signal to the IWF 60 and sends a call release completion message the MSC 50 upon receipt of the reset completion signal. Finally, the communication channel between the mobile terminal 20 and the MSC 50 is released.

According to the typical wireless communication system shown above, the system can be converted to a fax mode by sending a ATD command from the data terminal to the mobile terminal or sending a fax signal after the opposite side mobile terminal converts to a fax mode during the voice communication. Once a fax mode is set, data transmits from the transmitting data terminal 10 to the receiving data terminal 80 through the mobile terminal 20. On the other hand, the data transmitted from the receiving data terminal are transmitted to the data terminal 10 through the mobile terminal 20.

However, in a case where the mode switches from a voice communication mode to a fax mode for fax data transmission during voice conversation, the commands that the application program can use are limited to ATD or Remote Initiated commands. In other words, it is quite difficult to switch to another phone number when a connection is once made by the ATD command.

SUMMARY OF THE INVENTION

Accordingly, the present invention is directed to method for transmitting and receiving data using a mobile terminal that substantially obviates one or more problems due to limitations and disadvantages of the related art.

An object of the present invention is to provide methods for transmitting and receiving data in a data communication system including a mobile terminal, in which the mode of the communication system is converted from a Voice mode to a Data (Fax) mode without disconnecting the voice communication line made earlier by transmitting a ATD command with a receiving side telephone number.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting data in a data communication system having a transmitting data terminal and a mobile terminal includes establishing a voice communication channel between the mobile terminal and a receiving data terminal in the data communication system set to a Voice mode; setting the data communication system to a Data mode without disconnecting the voice data communication channel by transmitting a first connection request command and a telephone number of the receiving data terminal by the transmitting data terminal to the mobile terminal; establishing a data communication channel between the transmitting and receiving data terminals; and transmitting data by the transmitting data terminal to the receiving data terminal through the data communication channel.

In another aspect of the present invention, a method for receiving data in a data communication system having a mobile terminal and a receiving data terminal includes establishing a voice communication channel between the mobile terminal and a transmitting data terminal in the data communication system set to a Voice mode; setting the data communication system to a Data mode without disconnecting the voice communication channel if a telephone number received by the mobile terminal together with a first connection request from the transmitting data terminal is correct; establishing a data communication channel between the transmitting and receiving data terminals; and receiving data by the receiving data terminal from the transmitting data terminal through the data communication channel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
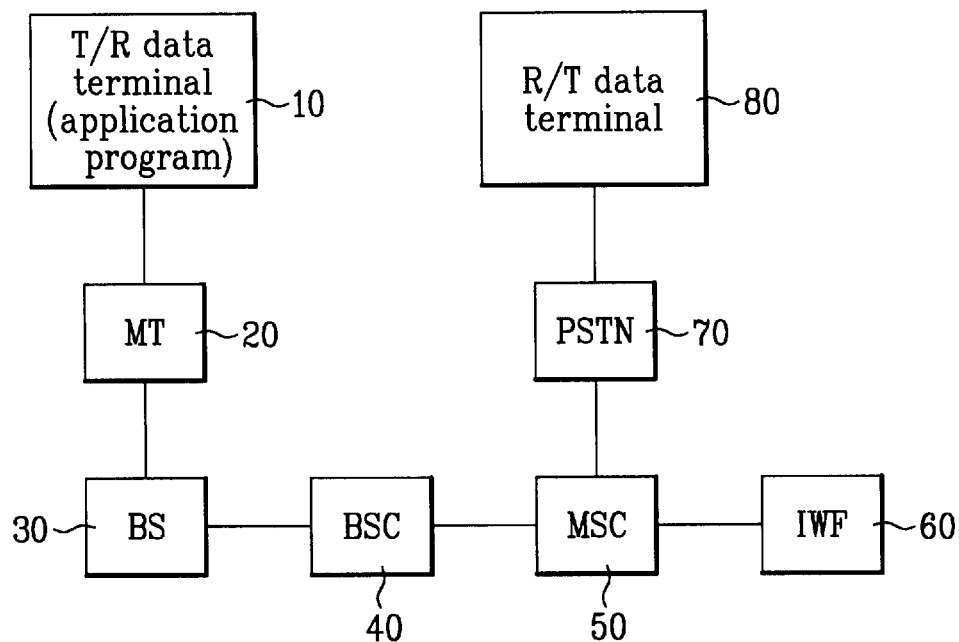
FIG. 1 illustrates a typical wireless data communication system according to the related art.
Figure 2:
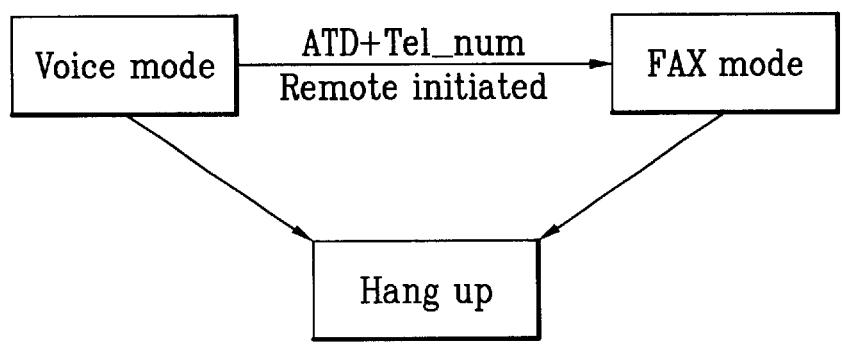
FIG. 2 illustrates a mode conversion of a data communication system according the present invention.

FIG. 2 illustrates a mode conversion of a data communication system from a Voice mode to a Data (Fax) mode according to the present invention. A transmitting data terminal sends a ATD command and a telephone number of a corresponding receiving data terminal to a mobile terminal for converting the mode of the data communication system from a Voice mode to a Data (Fax) mode. The mode conversion processes included in methods for transmitting and receiving data using a mobile terminal will be explained in more detail later in this section.

Figure 3:
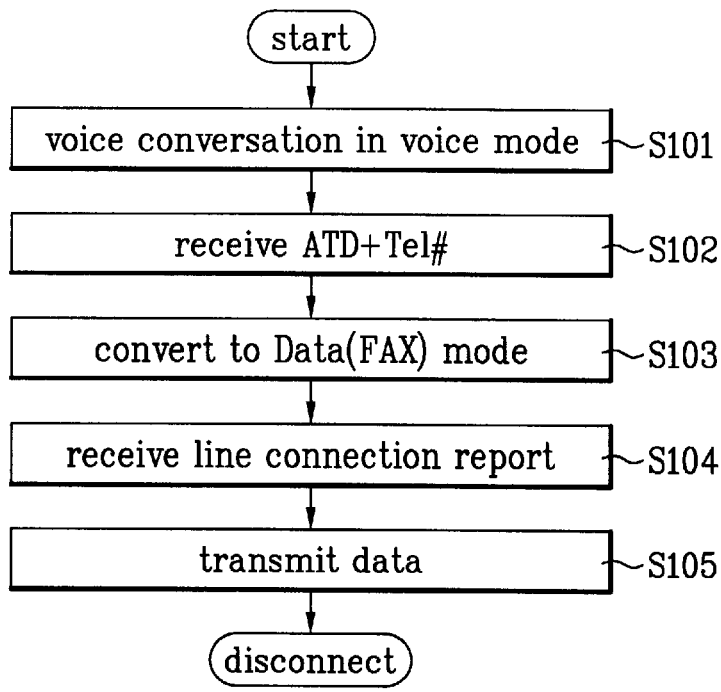
FIG. 3 illustrates a method for transmitting data using a mobile terminal in a data communication system according to the first embodiment of the present invention.

FIG. 3 illustrates a method for transmitting data using a mobile terminal in a communication system according to a first embodiment of the present invention. According to FIG. 3, after a voice communication line connection is made between a mobile terminal 20 and a receiving data terminal 80 in a data communication system set to a Voice mode (S101), a transmitting data terminal 10 sends a ATD command and a receiving side telephone number to the mobile terminal 20 in order to convert the mode of the communication system to a Data (Fax) mode without disconnecting the voice communication line made earlier (S102 S103).

Then the ATD command and the receiving side telephone number are transmitted to a MSC 50 through a base station 30 and a BSC 40, and the MSC 50 analyzes the ATD command and the telephone number to check whether it is an asynchronous circuit data service request. If it is, the MSC 50 sends a connection request to the receiving data terminal 80 connected to a PSTN 70. When a connection line to the receiving data terminal is set up successfully after the connection request is allowed by the receiving data terminal, the MSC 50 reports this to the data terminal 10 through the BSC 40, the base station 30, and the mobile terminal 20 (S104). Thereafter, the data terminal 10 sends data to the MSC 50 through the base station 30 and the MSC 40, and the MSC 50 and the IWF 60 sends the received data to the receiving data terminal 80 connected to the PSTN 70 (S105). When the data transmission is completed, the data terminal 10 sends a call-releasing request and a modem-releasing request to disconnect the data communication channel. In addition, if the connection request made by the MSC 50 is rejected because the receiving data terminal is busy, the transmitting data terminal can resend another receiving side telephone number to try to set up a new data communication channel and to transmit the data.

Figure 4:
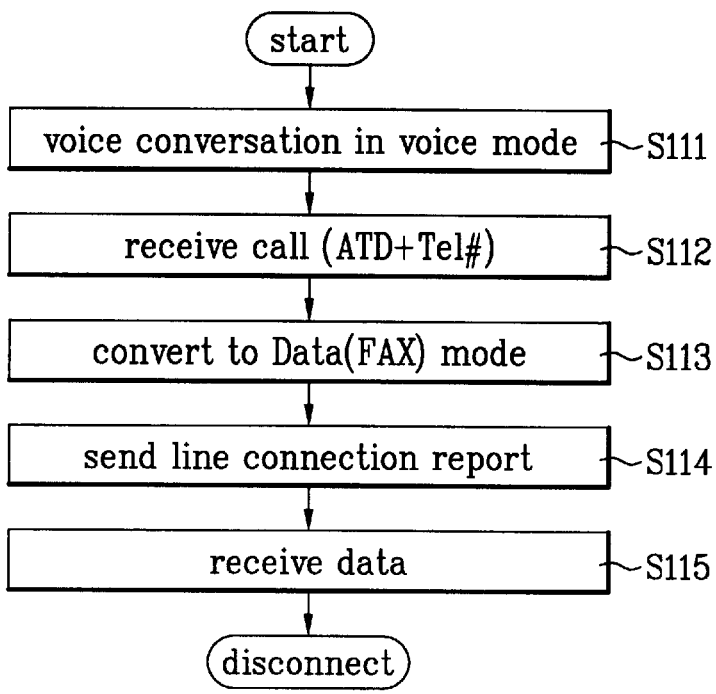
FIG. 4 illustrates a method for receiving data using a mobile terminal in a data communication system according to the second embodiment of the present invention.

On the other hand, FIG. 4 illustrates a method for receiving data using a mobile station in a communication system according to the second embodiment of the present invention. After a voice communication channel connection is made between a mobile communication system 20 and a transmitting data terminal 80 in a communication system set to a Voice mode (S111), the transmitting data terminal 80 sends a ATD command and a connection requesting signal (call signal) including a telephone number to the mobile terminal (S112). Then the mobile terminal checks whether the phone number included in the connection requesting signal is correct. If it is determined to be the correct number, the mode of the communication system is converted to a Data (Fax) mode (S113). When the mode is converted to the Data (Fax) mode, this is reported to the MSC 50, and the transmitting data terminal receives a data communication channel connection report (S115). Finally, the data communication channel is disconnected when the transmitting data terminal sends a modem release requesting signal or a call release-requesting signal.

By sending a receiving side telephone number to the mobile terminal together with a connection request signal (ATD command) as shown in the data communication method according to the present invention, a user can transmit or receive data more conveniently during the wireless conversation. In other words, the mode of the communication system can simply be converted from a Voice mode to a Data (Fax) mode by transmitting a ATD command together with a receiving side telephone number so that it can provide a substantial convenience to a user when transmitting or receiving data during a wireless phone conversation.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for transmitting data in a data communication system having a transmitting data terminal and a mobile terminal, the method comprising the steps of:

establishing a voice communication channel between said mobile terminal and a receiving data terminal using said data communication system set to a Voice mode;

setting said data communication system to a Data mode without disconnecting said voice communication channel by transmitting a first connection request and a receiving side telephone number to said mobile terminal;

establishing a data communication channel between said transmitting and receiving data terminals; and transmitting data by said transmitting data terminal to said receiving data terminal through said data communication channel.

2. The method of claim 1, further comprising the steps of:

transmitting said first connection request and said telephone number received by said mobile terminal to a mobile switching center; and sending a second connection request from said mobile switching center to said receiving data terminal if said first connection request is determined to be an asynchronous circuit data service request.

3. The method of claim 2, wherein said transmitting data terminal sends another receiving side telephone number if said second connection request is not accepted by said receiving data terminal.

4. The method of claim 1, further comprising the step of reporting to said transmitting data terminal after said step of establishing said data communication channel if said second connection request is accepted.

5. The method of claim 1, wherein said receiving data terminal is connected to a Public Switch Telephone Network.

6. The method of claim 1, further comprising the steps of:

sending a call-releasing request or a modem-releasing request by said transmitting data terminal when said data are transmitted completely; and disconnecting said data communication channel if any one of said releasing requests sent is accepted.

7. A method for receiving data in a data communication system having a mobile terminal and a receiving data terminal, the method comprising the steps of:

establishing a voice communication channel between said mobile terminal and a transmitting data terminal using said data communication system set to a Voice mode;

setting said data communication system to a Data mode without disconnecting said voice communication channel if a telephone number received by said mobile terminal together with a first connection request command from said transmitting data terminal is correct;

establishing a data communication channel between said transmitting and receiving data terminals; and receiving data by said receiving data terminal from said transmitting data terminal through said data communication channel.

8. The method of claim 7, wherein said receiving data terminal is connected to a Public Switch Telephone Network.

9. The method of claim 7, further comprising the steps of:

reporting to a mobile switching center when said data communication system is set to said data mode;

transmitting a data communication connection report to said transmitting data terminal; and disconnecting said data communication channel after receiving a call-releasing request from said transmitting data terminal.

* * * * *